Figure 1:
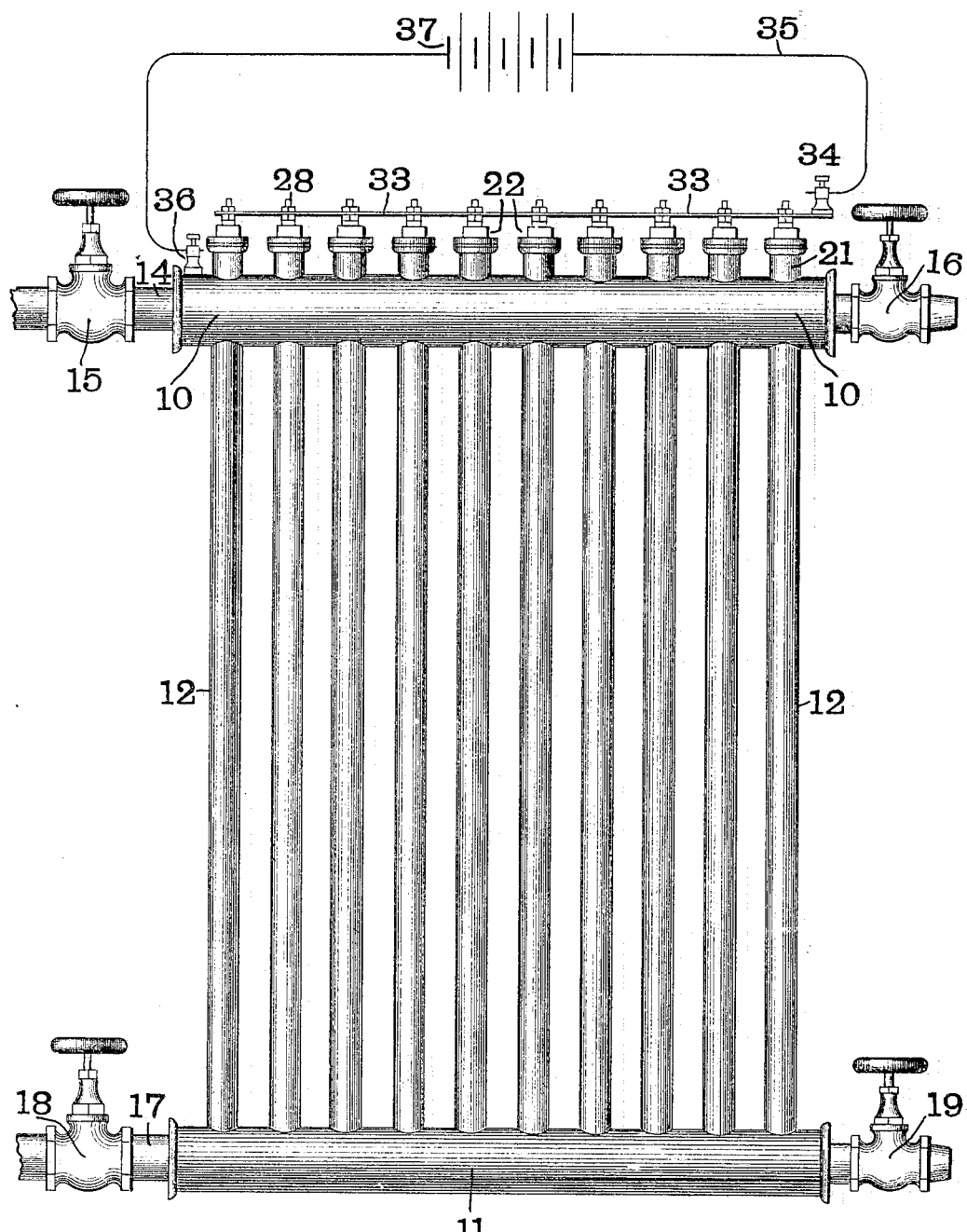

No. 769,750. PATENTED SEPT. 13, 1904.
F. G. KUNÉ.
WATER PURIFIER.
APPLICATION FILED DEC. 19, 1903.
NO MODEL. 2 SHEETS—SHEET 1.

Witnesses
W. H. Alexander
Fred Henke

Inventor
Frederick G. Kuné.
By Attorneys

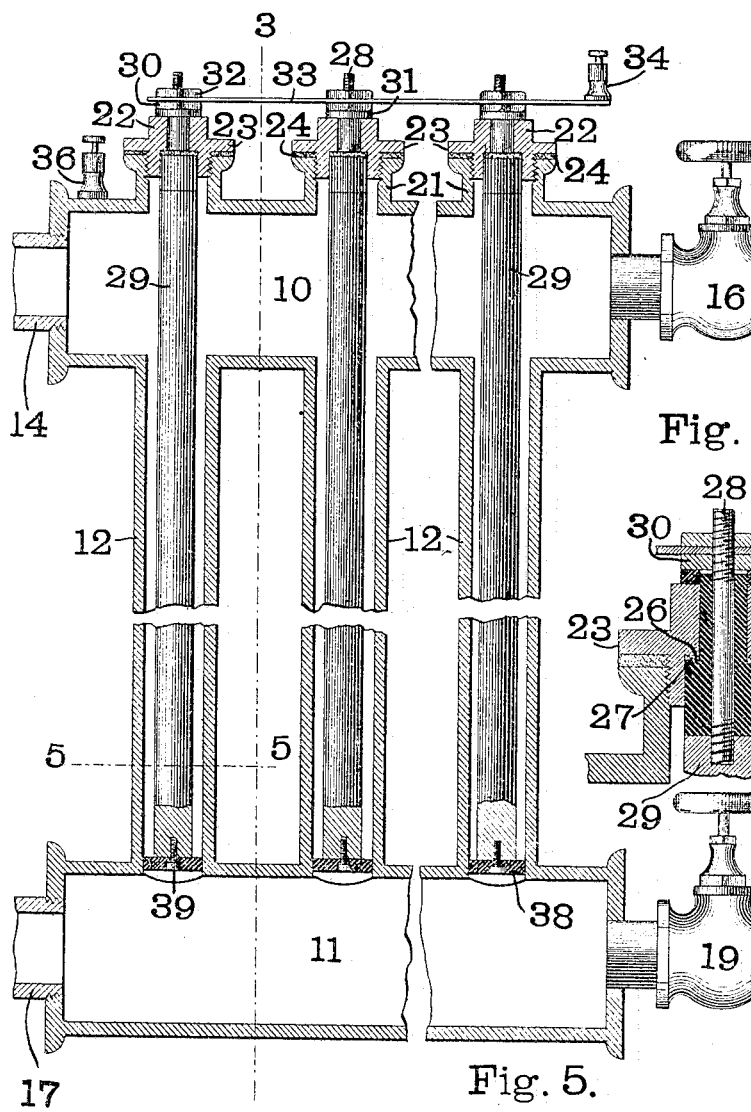
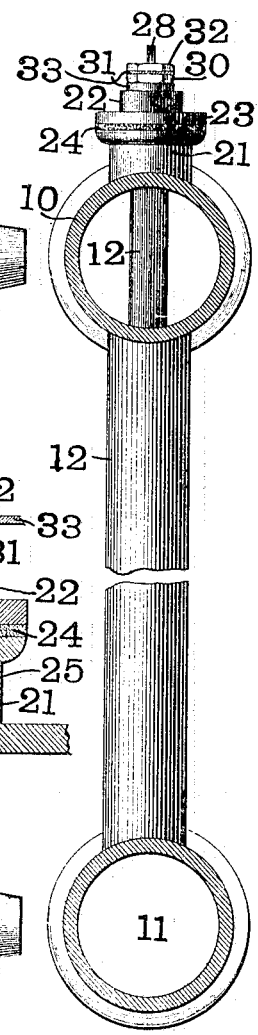
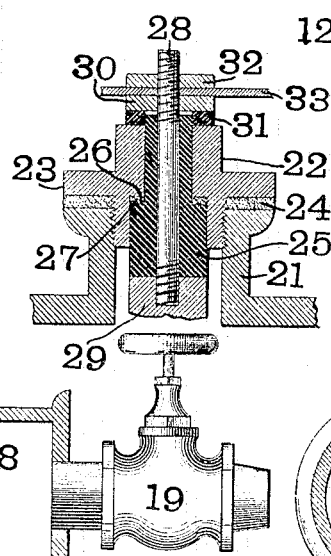
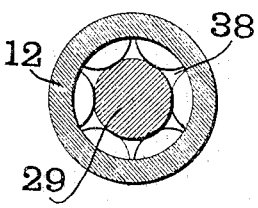

No. 769,750. Patented September 13, 1904.

UNITED STATES PATENT OFFICE.

FREDERICK G. KUNÉ, OF NEW YORK, N. Y.

WATER-PURIFIER.

SPECIFICATION forming part of Letters Patent No. 769,750, dated September 13, 1904.

Application filed December 19, 1903. Serial No. 185,797. (No model.)

*To all whom it may concern:*

Be it known that I, FREDERICK G. KUNÉ, a citizen of the United States, residing at the city of New York, borough of Brooklyn, county of Kings, in the State of New York, have invented a certain new and useful Water-Purifier, of which the following is such a full, clear, and exact description as will enable any one skilled in the art to which it appertains to make and use the same, reference being had to the accompanying drawings, forming part of this specification.

The object of my invention is to construct an electrolytic water-purifier which will effectively subject the water to the action of the current and at the same time will allow a large quantity of water to pass through the purifier, so that the purification will be rapidly accomplished.

Another object of my invention is to construct the purifier with the fewest possible joints and to make the necessary joints perfectly water-tight.

My invention consists in part in the combination, with a plurality of conduits having a common inlet and a common outlet, said conduits being imperforate between said inlet and outlet, of means for subjecting the water while flowing through said conduits to the action of an electric current.

My invention also consists in various other novel features and details of construction, all of which are described in the following specification and pointed out in the claims affixed hereto.

In the accompanying drawings, which illustrate one form of purifier made in accordance with my invention, Figure 1 is a side elevation, the electric circuit being shown diagrammatically. Fig. 2 is an enlarged sectional view showing details of construction. Fig. 3 is a section on the line 3 3 of Fig. 2. Fig. 4 is an enlarged section showing the method of supporting the electrodes from the casing, and Fig. 5 is an enlarged section on the line 5 5 of Fig. 2.

Like marks of reference refer to similar parts in the several views of the drawings.

10 is the inlet-passage, and 11 the outlet-passage. The passages 10 and 11 are connected by a plurality of imperforate conduits 12. These conduits 12 are formed of conducting material and are preferably formed integral with the passages 10 and 11, as shown in the drawings, so as to obviate the use of joints between the conduits and passages. Leading to the inlet-passage 10 is a supply-pipe 14, in which is situated a valve 15 for regulating the flow of water through the purifier. The opposite end of the supply-passage 10 is provided with a valve 16, by means of which the supply-passage 10 may be cleaned. The outlet-passage 11 is provided with a discharge-pipe 17, in which is situated a valve 18 for regulating the discharge of water from the purifier. The opposite end of the outlet-passage 11 is provided with a valve 19, by means of which the outlet-passage 11 may be cleaned.

On the inlet-passage 10 are formed, opposite the conduit 12, short pipes 21. In each of these pipes 21 is a threaded plug 22, provided with a flange 23. Between this flange 23 and the upper edge of the pipe 21 is a rubber gasket 24 or other suitable packing for forming a water-tight joint between the pipe 21 and the plug. Extending centrally through the plug 22 is an offset opening in which is situated an insulating-plug 25, having a shoulder 26. Between this shoulder 26 and the corresponding shoulder of the plug 22 is a rubber gasket 27 or other suitable packing for forming a water-tight joint between the plug 22 and the insulating-plug 25. Extending through the insulating-plug 25 is the end 28 of an electrode 29, which electrode extends through the conduit 12. The end 28 may be formed integral with the electrode 29, but is preferably threaded therein, as shown in Fig. 4 of the drawings. The upper part of this end 28 is threaded and engages with a nut 30, which bears upon an insulating-washer 31, which in turn rests upon the plug 22 and surrounds the upper end of the insulating-plug 25. By tightening the nut 30 the shoulder 26 is drawn firmly against the packing 27, so as to form a water-tight joint between the two plugs and at the same time hold the electrode firmly in position. Above the nut 30 is a second nut 32, and between these nuts is a strip 33 of conducting material which electrically connects all the electrodes 29. Secured to this strip 33 is a binding-post 34, to which is connected one end of a line-wire 35, the opposite end of which is connected to a binding-post 36, carried on the inlet-passage 10. Situated in the circuit 35 is a battery 37 or other source of electrical energy. Secured to the lower end of each of the electrodes 29 is a rosette 38, of insulating material, the shape of which is best shown in Fig. 5. This rosette is secured to the lower end of the electrode by means of a screw 39, passing through the said rosette into the electrode, as shown in Fig. 2. The shape of the rosette is such as to prevent contact of the electrode with the conduit and at the same time to allow free flow of the water into the outlet-passage 11.

In the operation of my purifier the water passes into the inlet-passage 10 through the supply-pipe 14, the flow being regulated by the valve 15. The water then passes down simultaneously through the various conduits 12 and is subjected to the action of the current flowing between the said conduits and the electrodes 29. Owing to the number of conduits used, a large flow of water is obtained, and at the same time the space between the conduit and electrode can be made so small that the water is perfectly purified. The discharge of the water through the passage 17 is regulated by the valve 18. As the inlet and outlet passages 10 and 11 are formed integral with the conduits 12, there are very few joints in the purifier, and hence liability of leakage is greatly lessened. The manner of supporting the electrodes insures a water-tight joint between the various parts and at the same time firmly holds the electrode in position.

In place of causing the water to flow in the direction above described the inlet and outlet may be reversed, the water flowing into the manifold 11 and thence up through the pipes into the manifold 10. This mode of operation is preferable in case it is desired to run the purifier at less than its full capacity.

Having fully described my invention, what I claim as new, and desire to secure by Letters Patent of the United States, is—

1. In a water-purifier, the combination with a plurality of conduits having a common inlet and common outlet, said conduits being imperforate between said inlet and outlet, of means for subjecting the water while flowing through said conduits to the action of an electric current.

2. In a water-purifier, the combination with a plurality of imperforate conducting-conduits, of electrodes in said conduits but insulated therefrom, electrical connections connecting said conduits and electrodes with a source of electrical energy, and supply and discharge passages for the entire flow of the water common to said conduits.

3. In a water-purifier, the combination with a plurality of imperforate conducting-conduits, of electrodes in said conduits but insulated therefrom, electrical connections connecting said conduits and electrodes with a source of electrical energy, and supply and discharge passages common to said conduits and formed integral therewith.

4. In a water-purifier, the combination with a pair of manifolds, of a plurality of imperforate conduits connecting said manifolds, and means for subjecting the water while flowing through said conduits to the action of an electric current.

5. In a water-purifier, the combination with a pair of manifolds, of a plurality of imperforate conducting-conduits connecting said manifolds, electrodes in said conduits, and electrical connections connecting said electrodes and conduits with the source of electrical supply.

6. In a water-purifier, the combination with a pair of manifolds, of a plurality of imperforate conducting-conduits connecting said manifolds, electrodes in said conduits and extending through one of said manifolds, and electrical connections connecting said electrodes and conduits with the source of electrical energy.

7. In a water-purifier, the combination with a pair of manifolds, of a plurality of imperforate conducting-conduits connecting said manifolds, electrodes in said conduits, electrical connections connecting said electrodes and conduits with the source of electrical energy, an inlet for one of said manifolds, an outlet for the other of said manifolds, and a drain-cock for each of said manifolds.

8. In a water-purifier, the combination with an electrode, of a casing therefor, a threaded plug engaging said casing, a packing between said plug and casing, an insulating-plug provided with a shoulder and passing through said first-named plug, a packing between said shoulder and first-named plug, and means for supporting said electrode from said insulating-plug.

9. In a water-purifier, the combination with an electrode, of a casing therefor, a threaded plug engaging said casing, a packing between said plug and casing, an insulating-plug provided with a shoulder and passing through said first-named plug, a packing between said shoulder and plug, an insulating-washer surrounding the end of said insulating-plug and bearing against the end of said first-named plug, and a nut engaging the projecting end of said electrodes and bearing against said washer.

In testimony whereof I have hereunto set my hand and affixed my seal in the presence of the two subscribing witnesses.

FREDERICK G. KUNÉ. [L. S.]

Witnesses:
JAMES H. BRYSON,
W. A. ALEXANDER.